United States Patent
Al Sayeed et al.

(10) Patent No.: US 9,906,294 B2
(45) Date of Patent: Feb. 27, 2018

(54) SYSTEMS AND METHODS IMPROVING OPTICAL RESTORATION TIME IN NETWORKS

(71) Applicant: Ciena Corporation, Hanover, MD (US)

(72) Inventors: Choudhury A. Al Sayeed, Gloucester (CA); Gerard Leo Swinkels, Ottawa (CA)

(73) Assignee: Ciena Corporation, Hanover, MD (US)

( * ) Notice: Subject to any disclaimer, the term of this patent is extended or adjusted under 35 U.S.C. 154(b) by 289 days.

(21) Appl. No.: 14/862,267

(22) Filed: Sep. 23, 2015

(65) Prior Publication Data

US 2017/0085316 A1 Mar. 23, 2017

(51) Int. Cl.
  *H04B 10/00* (2013.01)
  *H04B 10/03* (2013.01)
  *H04J 14/02* (2006.01)

(52) U.S. Cl.
  CPC .......... *H04B 10/03* (2013.01); *H04J 14/0201* (2013.01)

(58) Field of Classification Search
  CPC .. H04B 10/032; H04B 10/0777; H04B 10/03; H04B 10/038; H04B 10/0775; H04J 14/0201; H04J 14/0291; H04J 14/0295; H04J 14/0268; H04L 45/28; H04L 45/22; H04Q 2011/0081
  USPC .................................. 398/1, 2, 4, 5, 7, 6, 25
  See application file for complete search history.

(56) References Cited

U.S. PATENT DOCUMENTS

| | | | | |
|---|---|---|---|---|
| 6,130,876 A | * | 10/2000 | Chaudhuri | H04J 14/0212 370/228 |
| 6,600,719 B1 | * | 7/2003 | Chaudhuri | H04J 14/0212 370/228 |
| 6,996,342 B2 | | 2/2006 | Park et al. | |
| 7,142,505 B2 | * | 11/2006 | Chaudhuri | H04J 14/0227 370/225 |
| 7,551,553 B2 | * | 6/2009 | Chaudhuri | H04J 14/0227 370/225 |
| 7,979,222 B2 | * | 7/2011 | Donde | H02J 3/00 702/61 |
| 8,150,257 B1 | * | 4/2012 | Choudhury | H04L 41/0681 398/175 |

(Continued)

FOREIGN PATENT DOCUMENTS

WO 2013037426 A1 3/2013

OTHER PUBLICATIONS

E. Mannie, Request for Comments: 3945, Generalized Multi-Protocol Label Switching (GMPLS) Architecture, Oct. 2004.

(Continued)

*Primary Examiner* — Hibret Woldekidan
(74) *Attorney, Agent, or Firm* — Clements Bernard Walker PLLC; Christopher L. Barnard; Lawrence A. Baratta, Jr.

(57) ABSTRACT

Systems and methods for improving optical restoration time in a network include maintaining a status of wavelength load for a plurality of optical links in the network; utilizing the wavelength load to estimate a restoration time for one or more wavelengths being added to each of the plurality of optical links; and determining one or more restoration paths for the one or more wavelengths in the network and considering a total service restoration time in selecting a path for each of the one or more wavelengths, wherein each of the one or more restoration paths comprises one or more of the plurality of optical links.

20 Claims, 6 Drawing Sheets

(56) References Cited

U.S. PATENT DOCUMENTS

| | | | |
|---|---|---|---|
| 8,402,121 B2 | 3/2013 | Skalecki et al. | |
| 8,509,621 B2 | 8/2013 | Boertjes et al. | |
| 8,750,706 B2 | 6/2014 | Boertjes et al. | |
| 8,774,627 B2 | 7/2014 | Luss et al. | |
| 9,800,325 B1 * | 10/2017 | Skalecki | H04B 10/03 |
| 9,832,548 B2 * | 11/2017 | Moynihan | H04L 45/50 |
| 2004/0073700 A1 * | 4/2004 | Chaudhuri | H04J 14/0227 |
| | | | 709/239 |
| 2005/0086445 A1 * | 4/2005 | Mizuno | G06F 11/1451 |
| | | | 711/162 |
| 2013/0177311 A1 * | 7/2013 | Trnkus | H04J 14/0227 |
| | | | 398/28 |
| 2013/0308948 A1 | 11/2013 | Swinkels et al. | |
| 2014/0112660 A1 | 4/2014 | Al Sayeed et al. | |
| 2014/0126899 A1 * | 5/2014 | Prakash | H04L 45/28 |
| | | | 398/5 |
| 2014/0169791 A1 | 6/2014 | Swinkels et al. | |
| 2014/0314409 A1 | 10/2014 | Swinkels et al. | |
| 2014/0328583 A1 | 11/2014 | Al Sayeed et al. | |

OTHER PUBLICATIONS

ITU-T Recommendation G.8080/Y.1304, Architecture for the automatically switched optical network, Feb. 2012.

* cited by examiner

N = Time required per hop to add channels in a bundle.

| Route Option | Restoration Routes | Ch's to Restore | Ch's already In-service on the path before restoration | Max. # of Bundles required for any hop to complete restoration | Number of Hops | Restoration Time per route | Overall Restoration Time | Spectral Utilization after restoration |
|---|---|---|---|---|---|---|---|---|
| 1 | A – Z | 48 | 12 | 4 | 1 | N*4*1 = 4N | 4N | 60/96 = 0.63 |
| 2 | A – C – Z | 48 | 24 | 2 | 2 | N*2*2 = 4N | 4N | 72/96 = 0.75 |
| 3 | A – D – E – Z | 48 | 48 | 1 | 3 | N*1*3 = 3N | 3N | 96/96 = 1.00 (congested) |
| 4 (Proposed Method) | A – D – E – Z | 12 | 48 | 1 | 3 | N*1*3 = 3N | 3N | 60/96 = 0.63 |
|  | A – Z | 12 | 12 | 1 | 1 | N*1*1 = N |  | 24/96 = 0.25 |
|  | A – C – Z | 24 | 24 | 1 | 2 | N*1*2 = 2N |  | 48/96 = 0.50 |

FIG. 5

| Route Option | Restoration Routes | Ch's to Restore | Ch's already In-service on the path before restoration | Max. # of Bundles required for any hop to complete restoration | Number of Hops | Restoration Time per route | Overall Restoration Time | Spectral Utilization after restoration |
|---|---|---|---|---|---|---|---|---|
| 1 | A – Z | 48 | 48 | 1 | 1 | N*1*1 = N | N | 96/96 = 1.00 (congested) |
| 2 | A – C – Z | 48 | 24 | 2 | 2 | N*2*2 = 4N | 4N | 72/96 = 0.75 |
| 3 | A – D – E – Z | 48 | 12 | 4 | 3 | N*4*3 = 12N | 12N | 60/96 = 0.63 |
| 4 (Proposed Method) | A – Z | 24 | 48 | 1 | 1 | N*1*1 = N | 2N | 72/96 = 0.75 |
| | A – C – Z | 24 | 24 | 1 | 2 | N*1*2 = 2N | | 48/96 = 0.50 |

N = Time required per hop to add channels in a bundle.

SYSTEMS AND METHODS IMPROVING OPTICAL RESTORATION TIME IN NETWORKS

FIELD OF THE DISCLOSURE

The present disclosure generally relates to optical network systems and methods. More particularly, the present disclosure relates to systems and methods improving optical restoration time in networks.

BACKGROUND OF THE DISCLOSURE

Optical networks and the like (e.g., Dense Wave Division Multiplexing (DWDM), Optical Transport Network (OTN), Ethernet, and the like) at various layers are using distributed control planes and/or centralized controlled via Software Defined Networking (SDN). Control planes provide an automatic allocation of network resources in an end-to-end manner. Exemplary control planes may include Automatically Switched Optical Network (ASON) as defined in ITU-T G.8080/Y.1304, Architecture for the automatically switched optical network (ASON) (February 2005), the contents of which are herein incorporated by reference; Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is an optical signaling and routing protocol similar to Private Network-to-Network Interface (PNNI) and Multi-Protocol Label Switching (MPLS); or any other type control plane for controlling network elements at multiple layers, and establishing connections among nodes. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with an SDN controller knowing a full network topology through configuration or through the use of a controller-based discovery process in a network. Also, the distributed nature of control planes can be used in combination with the centralized nature of SDN in a hybrid approach.

Control planes, SDN, etc. are configured to automate various network operating processes including service restoration, service establishment, etc. Note, the service restoration and service establishment are generally a similar procedure which involves path computation, such as through a Path Computation Element (PCE) or the like, following by implementing the computed path in the underlying hardware. Conventional path establishment can use various techniques and algorithms to determine paths, such as Shortest Path Tree (SPT), Dijkstra's algorithm, various adjacency algorithms, etc. Of note, conventional techniques do not utilize restoration or service establishment time as a factor in path computation. Rather, these conventional techniques focus on avoiding or minimizing crank-backs or redials and not on the actual establishment time. Adding or removing channels in the photonic layer (optical layer, Layer 0, etc.) is slow relative to adding or removing channels in higher layers such as OTN or the like. Specifically, in the photonic layer, optical links require power optimization to minimize impacts to in-service channels while other channels are added or removed. Photonic restoration time not only scales with the number of hops but also with the number of channels being restored to a specific link. Ideally when a wavelength is deleted from, or added onto an Optical Multiplexed Section (OMS), the time taken would be fixed or would grow linearly in some deterministic fashion. In reality, there are dependencies on the existing wavelength load.

BRIEF SUMMARY OF THE DISCLOSURE

In an exemplary embodiment, a method for improving optical restoration time in a network includes maintaining a status of wavelength load for a plurality of optical links in the network; utilizing the wavelength load to estimate a restoration time for one or more wavelengths being added to each of the plurality of optical links; and determining one or more restoration paths for the one or more wavelengths in the network and considering a total restoration time in selecting a path for each of the one or more wavelengths, wherein each of the one or more restoration paths includes one or more of the plurality of optical links. The maintaining can be performed based on updates from one or more of a control plane and Software Defined Networking (SDN), and wherein the utilizing, and the determining can be performed by one or more of a control plane, a Software Defined Networking (SDN) controller, a Path Computation Element (PCE), a management system, and a planning tool. The estimated restoration time can be a unit of time to add a bundle of wavelengths to a particular optical link, and the estimated restoration time can be derived computationally. Here, the time taken for optically deleting the wavelengths from a faulted link (e.g. following a fiber cut) before adding them to a restoration path are ignored considering the fact that traffic has already been disrupted on the faulty link and the time required to optically remove the wavelengths or switch away from that path is minimal and deterministic. The total restoration time for a link can be a function of one or more of i) channels being restored, ii) a total number of the channels and iii) their spectral locations, iv) in-service channels that are already present on the link and v) their spectral locations, and vi) a number of optical amplifiers on the link. The determining can utilize a path computation technique with associated metrics for determining the one or more restoration paths, wherein the total restoration time is used to select the path based on one of a lowest total restoration time, the total restoration time in combination with the metrics, and based on at least meeting a maximum total restoration time. The maintaining and the utilizing can be performed over time, and the determining can be performed one of subsequent to a failure and offline to anticipate the failure. The method can further include, subsequent to the estimate, marking one or more links as unacceptable based on the restoration time. The determining one or more restoration paths for one or more wavelengths in the network can further include considering congestion avoidance as long as the total restoration time is not increased.

In another exemplary embodiment, an apparatus configured to improve optical restoration time in a network includes a network interface communicatively coupled to the network; a processor communicatively coupled to the network interface; and memory storing instructions that, when executed, cause the processor to maintain a status of wavelength load for a plurality of optical links in the network, utilize the wavelength load to estimate a restoration time for one or more wavelengths being added to each of the plurality of optical links, and determine one or more restoration paths for the one or more wavelengths in the network and considering a total restoration time in selecting a path for each of the one or more wavelengths, wherein each of the one or more restoration paths includes one or more of the plurality of optical links. The apparatus can maintain the status based on updates from one or more of a control plane and Software Defined Networking (SDN), and wherein the apparatus can be one or more of a controller executing a control plane, a Software Defined Networking (SDN) controller, a Path Computation Element (PCE), a management system, and a planning tool. The estimated restoration time can be a unit of time to add a bundle of wavelengths to a particular optical link, and the estimated restoration time can be derived computationally. Here, the time taken for optically deleting the wavelengths from a faulted link (e.g. following a fiber cut) before adding them to a restoration path are ignored considering the fact that traffic has already been disrupted on the faulty link and the time required to optically remove the wavelengths or switch away from that path is minimal and deterministic. The total restoration time for a link can be a function of one or more of i) channels being restored, ii) a total number of the channels and iii) their spectral locations, iv) in-service channels that are already present on the link and v) their spectral locations, and vi) a number of optical amplifiers on the link. A path computation technique can be used with associated metrics to determine the one or more restoration paths, wherein the total restoration time is used to select the path based on one of a lowest total restoration time, the total restoration time in combination with the metrics, and based on at least meeting a maximum total restoration time. The apparatus can maintain the status and performs the estimate over time and the apparatus can determine the one or more restoration paths one of subsequent to a failure and offline to anticipate the failure. The memory storing instructions that, when executed, can further cause the processor to, subsequent to the estimate, mark one or more links as unacceptable based on the restoration time. The one or more restoration paths for one or more wavelengths in the network can be determined further considering congestion avoidance as long as the total restoration time is not increased.

In a further exemplary embodiment, a node in a network configured to improve optical restoration time for one or more wavelengths includes one or more line modules configured to interface the one or more wavelengths with the network; and a controller communicatively coupled to the one or more line modules, wherein the controller is configured to maintain a status of wavelength load for a plurality of optical links in the network, utilize the wavelength load to estimate a restoration time for the one or more wavelengths being added to each of the plurality of optical links, and determine one or more restoration paths for the one or more wavelengths in the network and considering a total restoration time in selecting a path for each of the one or more wavelengths, wherein each of the one or more restoration paths includes one or more of the plurality of optical links. The total restoration time for a link can be a function of one or more of i) channels being restored, ii) a total number of the channels and iii) their spectral locations, iv) in-service channels that are already present on the link and v) their spectral locations, and vi) a number of optical amplifiers on the link. A path computation technique can be used with associated metrics for determining the one or more restoration paths, wherein the total restoration time can be used to select the path based on one of a lowest total restoration time, the total restoration time in combination with the metrics, and based on at least meeting a maximum total restoration time. The controller can maintain the status and performs the estimate over time and the apparatus can determine the one or more restoration paths one of subsequent to a failure and offline to anticipate the failure.

BRIEF DESCRIPTION OF THE DRAWINGS

The present disclosure is illustrated and described herein with reference to the various drawings, in which like reference numbers are used to denote like system components/method steps, as appropriate, and in which:

FIG. 7 is a block diagram of a controller which can be used for the SDN controller in FIG. 1, common equipment in the node of FIG. 6, a Path Computation Element (PCE), a planning tool, or the like.

DETAILED DESCRIPTION OF THE DISCLOSURE

In various exemplary embodiments, systems and methods are described for improving optical restoration time in networks. The systems and methods augment restoration or path computation techniques by understanding the impact of channel restoration in the presence of existing wavelengths. As such, the systems and methods include computing a network optimal restoration scheme for a given link failure such that all wavelengths are stored in the minimum amount of time. An exemplary objective of the systems and methods is to further take into consideration the number of existing channels on a given link such that the bundles of wavelengths being added to a given link is done in an optimal manner.

Exemplary Network

Figure 1:
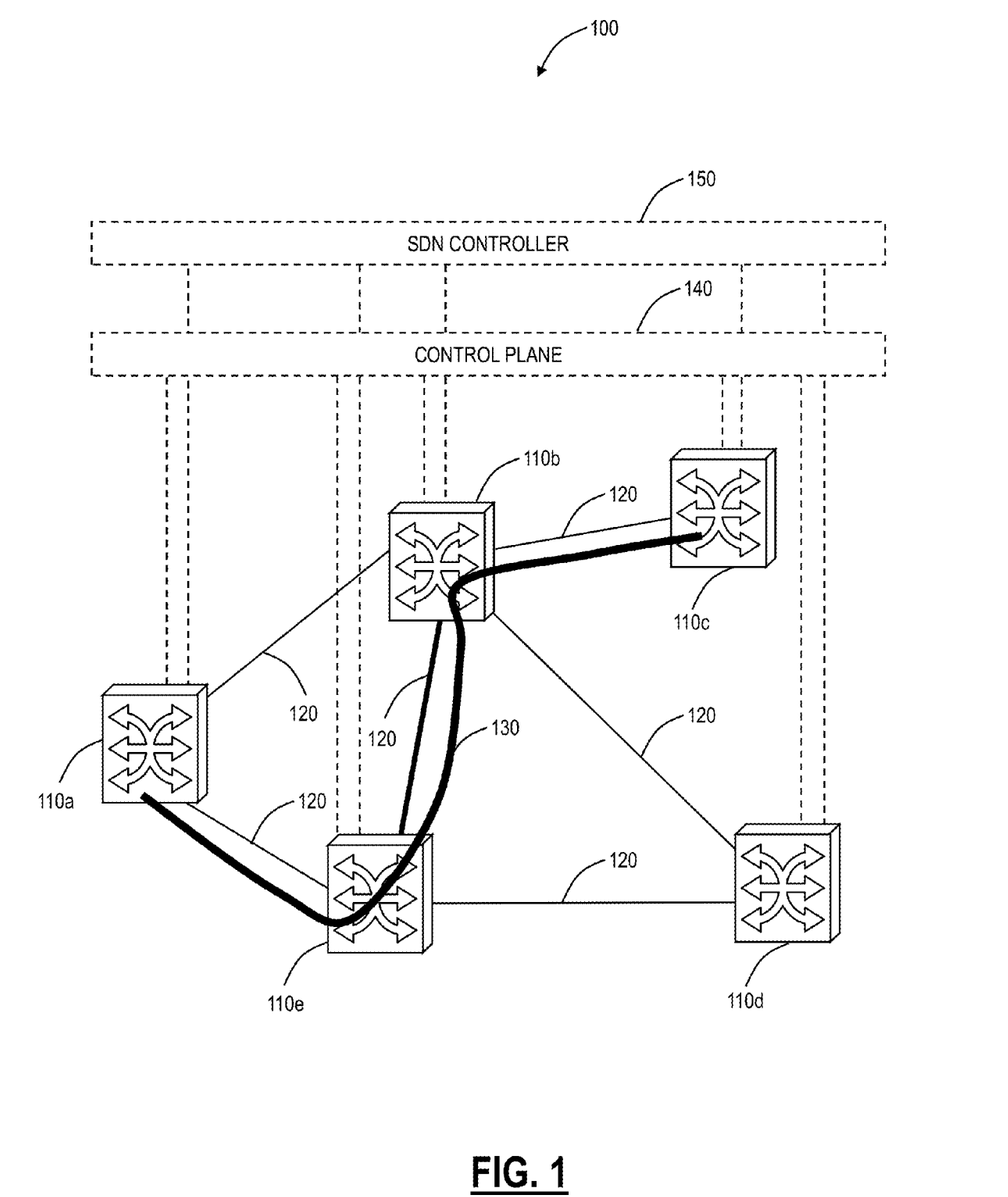
FIG. 1 is a network diagram of an exemplary network with five interconnected nodes.

Referring to FIG. 1, in an exemplary embodiment, a network diagram illustrates an exemplary network 100 with five interconnected nodes 110a, 110b, 110c, 110d, 110e. The nodes 110 are interconnected through a plurality of links 120. The nodes 110 communicate with one another over the links 120 which can include wavelengths, Time Division Multiplexed (TDM) or connection oriented connections, and/or packet connections. In the systems and methods, the links 120 at least include wavelength connections that are routed and rerouted between the nodes 110. The nodes 110 can be network elements which include a plurality of ingress and egress ports supporting wavelengths over the links 120. An exemplary node 110 is illustrated in FIG. 6. The network 100 includes a connection 130 with ingress/egress at the nodes 110a, 110c and intermediate nodes 110b, 110e. The connection 130 can be a Sub-Network Connection (SNC), a Label Switched Path (LSP), wavelength, or the like. The connection 130 is an end-to-end signaled path and from the view of the client signal contained therein, it is seen as a single network segment. Of course, the network 100 can include a plurality of connections. The nodes 110 can also be referred to interchangeably as network elements (NEs). The network 100 is illustrated, for example, as an interconnected mesh network, and those of ordinary skill in the art will recognize the network 100 can include other architectures, with additional nodes 110 or with fewer nodes 110, etc.

The network 100 can include a control plane 140 operating on and/or between the nodes 110a, 110b, 110c, 110d, 110e. The control plane 140 includes software, processes, algorithms, etc. that control configurable features of the network 100, such as automating discovery of the nodes 110, capacity on the links 120, port availability on the nodes 110, connectivity between ports; dissemination of topology and bandwidth information between the nodes 110; calculation and creation of paths for connections; network level protection and restoration; and the like. In an exemplary embodiment, the control plane 140 can utilize ASON, GMPLS, OSRP, MPLS, Open Shortest Path First (OSPF), Intermediate System-Intermediate System (IS-IS), or the like. Those of ordinary skill in the art will recognize the network 100 and the control plane 140 can utilize any type of control plane for controlling the nodes 110 and establishing and maintaining connections, such as at and between Layers 0, 1, 2, 3+, etc. Layers 3+ include the network through application layers (Layers 3-7).

An SDN controller 150 can also be communicatively coupled to the network 100 through one or more of the nodes 110. SDN works with the SDN controller 150 knowing a full network topology through configuration or through the use of a controller-based discovery process in the network 100. The SDN controller 150 differs from a management system in that it controls the forwarding behavior of the nodes 110 only, and performs control in real time or near real time, reacting to changes in services requested, network traffic analysis and network changes such as failure and degradation. Also, the SDN controller 150 provides a standard northbound interface to allow applications to access network resource information and policy-limited control over network behavior or treatment of application traffic. The SDN controller 150 sends commands to each of the nodes 110 to control matching of data flows received and actions to be taken, including any manipulation of packet contents and forwarding to specified egress ports. Examples of SDN include OpenFlow (www.opennetworking org/sdn-resources/onf-specifications/openflow/), General Switch Management Protocol (GSMP) defined in RFC 3294 (June 2002), and Forwarding and Control Element Separation (ForCES) defined in RFC 5810 (March 2010), the contents of all are incorporated by reference herein.

In an exemplary embodiment, the network 100 contemplates the use of the control plane 140. In another exemplary embodiment, the network 100 contemplates the SDN controller 150. In a further exemplary embodiment, the network 100 can include both the control plane 140 and the SDN controller 150, in a hybrid management approach. In a further exemplary embodiment, the network 100 can utilize a Network Management System (NMS), Element Management System (EMS), or the like. The systems and methods described herein contemplate operation in the network 100 with any control or management plane techniques.

Optimal Optical Restoration Time

The systems and methods begin by considering network optimal service placement in the event of a given link 120 failure. This is generally computed in a central location considering the network topology and all services currently on the network 100. A traditional planning tool or SDN application could perform this type of function. Typically a set of network paths (e.g., connections 130) from a source node 110 and a destination node 110 around a failed link 120 are computed and the best one is selected first. In terms of best, this could be least hops, least administrative weight, least latency, or some other interesting metric or other Figure of Merit.

Again, optical restoration time in layer 0 is typically slow (relative to higher layers). New service additions/deletions of wavelengths on the links 120 may create power offsets on the already active wavelengths, and hence, additional steps are required to ensure that the power offset on the active wavelengths remains within a given level (based on their available margin) before the next set of wavelengths are added/deleted. This forces add/delete behavior for a set of new services or wavelengths in an active optical link in multiple chunks or bundles, where between each bundle or chunk, a photonic control process is run to minimize power offsets on the already active services.

It is possible to estimate wavelength add time in the presence of existing channels and, more specifically, how many wavelengths can be rapidly added to the link 120 before the wavelength add time begins to increase. For example, if there are 10 wavelengths on an existing link 120, a wavelength growth algorithm may determine that doubling the number of wavelengths on the link 120 can be done quickly (e.g., without impacting the existing wavelengths) but the next one would be delayed (e.g., adding 10 wavelengths would be a quick photonic control process whereas adding the 11$^{th}$ wavelength would be a longer photonic control process). This is important because the addition of wavelengths on the link 120 is a slow process and having to wait for a patch of wavelengths to be added to the link 120 before more wavelengths can be added effectively doubles that service add time.

Process for Minimizing Optical Service Restoration Time

Figure 2:
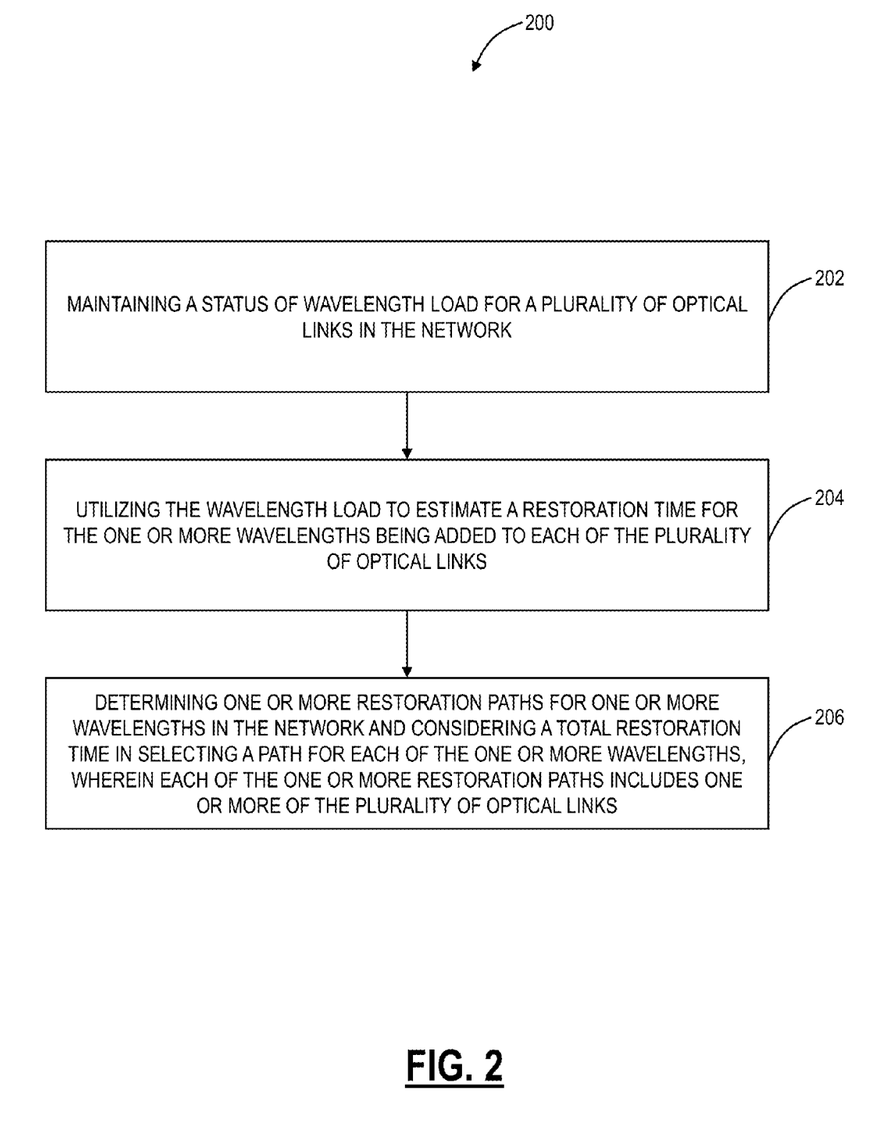
FIG. 2 is a flowchart of a process improving optical restoration time in a network.

Referring to FIG. 2, in an exemplary embodiment, a flowchart illustrates a process 200 improving optical restoration time in a network. The process 200 can be implemented by the nodes 110, the control plane 140, the SDN controller, a PCE, a management system, a planning tool, or a combination thereof. The process 20 includes maintaining a status of wavelength load for a plurality of optical links in the network (step 202); utilizing the wavelength load to estimate a restoration time for the one or more wavelengths being added to each of the plurality of optical links (step 204); and determining one or more restoration paths for one or more wavelengths in the network and considering a total restoration time in selecting a path for each of the one or more wavelengths, wherein each of the one or more restoration paths includes one or more of the plurality of optical links (step 206).

The optical links can be the links 120, Optical Multiplex Sections (OMSs), etc. Specifically, an optical link is between two of the nodes 110 with no intermediate optical add/drop. In an exemplary embodiment, the optical links are between Reconfigurable Optical Add/Drop Multiplexers (ROADMs), Optical Add/Drop Multiplexers (OADMs), and/or DWDM terminals. The status of the wavelengths on each optical link can be obtained from the nodes 110, the control plane 140, the SDN controller, a PCE, a management system, a planning tool, or a combination thereof. For example, the process 200 can obtain an initial wavelength load per optical link, and the status can be updated as wavelengths are added or removed in the network 100.

At any given time, the current wavelength loads that are maintained by the process 200 can be used to estimate the restoration time for wavelengths being added to each of the optical links. This estimate can be in units of time and can be based on a number of additional wavelengths for each link. For example, a specific link could have 10 wavelengths as the current wavelength load and the restoration time estimate to add 1 to 10 wavelengths could be N, whereas the restoration time to add 11 to 20 wavelengths could be 2N. Also, here, wavelengths are added in bundles of 10; other values are contemplated. The restoration time in an optical link between two optical add/drop multiplexer (OADM) hops depends on multiple factors including i) the channels to be restored, ii) their total numbers and their spectral locations, iii) the channels that are already present on that link and their spectral locations, and vi) the number of optical amplifiers (for example, erbium doped fiber amplifiers (EDFAs)) between the OADM hops. The estimates can be based on historical data, calculations, or the like. Also, these factors can be used to define how many bundles will be required to restore all channels to an optical link that also defines restoration time for that optical link. For a specific route that involves single or multiple optical links, the restoration time typically grows with the number of OADM hops almost linearly.

For determining the one or more restoration paths, the process 200 contemplate various techniques. For example, the restoration paths could be computed in the way generally practiced, e.g., SPT, Dijkstra's algorithm, etc. The determining can also include addressing the services with the most challenging path and/or optimization criteria and determining their paths first and also noting which services were unable to find their paths that would satisfy their mandatory optimization criteria (i.e., no path is satisfactory). The determining can also include recording the number of valid paths a service could take (either an exhaustive list or subset of a maximum number may be generated or capped at a percentage greater than the best path). Also, the determining could note if services could not be restored due to capacity exhaustion.

After or during the determination of the one or more restoration paths, the process 200 further includes considering the total service restoration time for each of the restoration paths. For each restoration path, the process 200 can compute a total restoration time which is based on the estimates. For example, if the restoration path includes a single optical link, the total restoration time can be set to the estimate for the single optical link. If the restoration path includes multiple optical links, the total restoration time can be a combination of the estimates for each of the multiple optical links.

The process 200 includes considering the total service restoration time as part of selecting a path of the one or more restoration paths. Again, the determination of the one or more restoration paths can be based on least hops, least administrative weight, least latency, or some other interesting metric or other Figure of Merit. The process 200 also includes total restoration time as a new Figure of Merit. The determination can be made solely based on the lowest total restoration time, based on the total restoration time in combination with other metrics, or based on meeting a maximum total restoration time. Note, in using the total restoration time as criteria, a specific service may be routed on a restoration path which is not necessarily the shortest path, the least used path spectrally, or the like. That is, a longer, seemingly less optimal path may be chosen because it has a lower total restoration time.

The initial wavelength load and final wavelength load are important factors in determining the overall service restoration time. In an exemplary embodiment, the process 200 can note, after determining the restoration paths, if any wavelength addition was delayed or suspended in order not to violate the maximum number of simultaneous wavelength additions for a given link. If there are no delays, then there is nothing to do and the process 200 can select the path based on criteria other than the total restoration time. If there is a total restoration time, the process 200 can note the total restoration time for all services and which services experienced how many delays as well as determining the minimum restoration time.

The process 200 can be performed real-time, coincident with a failure and/or offline. The maintaining and the utilizing steps can be performed periodically. The determining step can be performed real-time, coincident with a failure or offline to plan in advance of the failure. In an exemplary embodiment, performing the determining step offline, there can be one or more restoration paths for the one or more wavelengths, and the process 200 can note the total restoration time for each. To select a path for each, the process 200 can include an analysis of how to restore paths in the network, not necessarily using the shortest path but adding the wavelengths into the network in an attempt to minimize the number of wavelength addition delays.

In the presence of wavelength addition delays, the process 200 can include analyzing the results to determine how many suspensions occurred due to delays and on which links. For example, there could be one link that delays/suspends service additions one, two, or even three times but more typically there is a variety of links that are incurring delays/suspensions. Now, if a wavelength has only one restoration path, then that path must be used regardless of the restoration time. Now, the process 200 can note the service restoration time for all the one or more wavelengths (note, as described herein, a wavelength can also be referred to as a service), which wavelengths experienced how many delays, and optionally record which links provided the delays. Even though there was nothing that could have been done to prevent these delays, it is important to understand when the next delay will occur, for the estimating. It could occur with the addition of one wavelength, or perhaps the delay has just incurred and another delay will not occur for another nine wavelengths.

In an exemplary embodiment, to start placing wavelengths in the network considering the total service restoration time, the placement order can be a least number of satisfactory paths followed by the shortest path. The wavelengths are restored in the placement order, such as one at a time. When an optical link is used, and the next use would result is a service add delay then the link can be marked for removal from consideration (e.g., DNU—do not use). When one or more links become unusable, the process 200 can update the restoration routes marking restoration paths with DNU links as unavailable. For those wavelengths with no valid routes, a minimum number of links are marked as usable and all wavelengths update the service restoration routes. The service placement order can also be recomputed.

The process 200 can continue until all restorable wavelengths have a restoration path for a given link failure. After the last wavelength has been successfully placed, a computation can be done to determine improvement in restoration times. If some wavelengths can no longer compute a restoration route due to mesh capacity exhaustion or no valid constrained paths, then a user policy determines whether to revert to the initial solution or to use the faster solution. For the determining step, once the routes are selected with proper channel distribution to achieve minimum restoration time for that given link failure for a set of channels, the selected routes are recorded and used when that link failure occurs.

This information for the selected routes could be implemented from a centralized controller (e.g., online planning tool or the SDN controller 150) or downloaded into a distributed control plane 140 the can be programmed with a per-wavelength specific restoration path to be used in the event of a specific link failure for all wavelengths, where that restoration function will be performed from (e.g., typically the source node).

Process for Selecting Paths to Improve Optical Service Restoration Time

Figure 3:
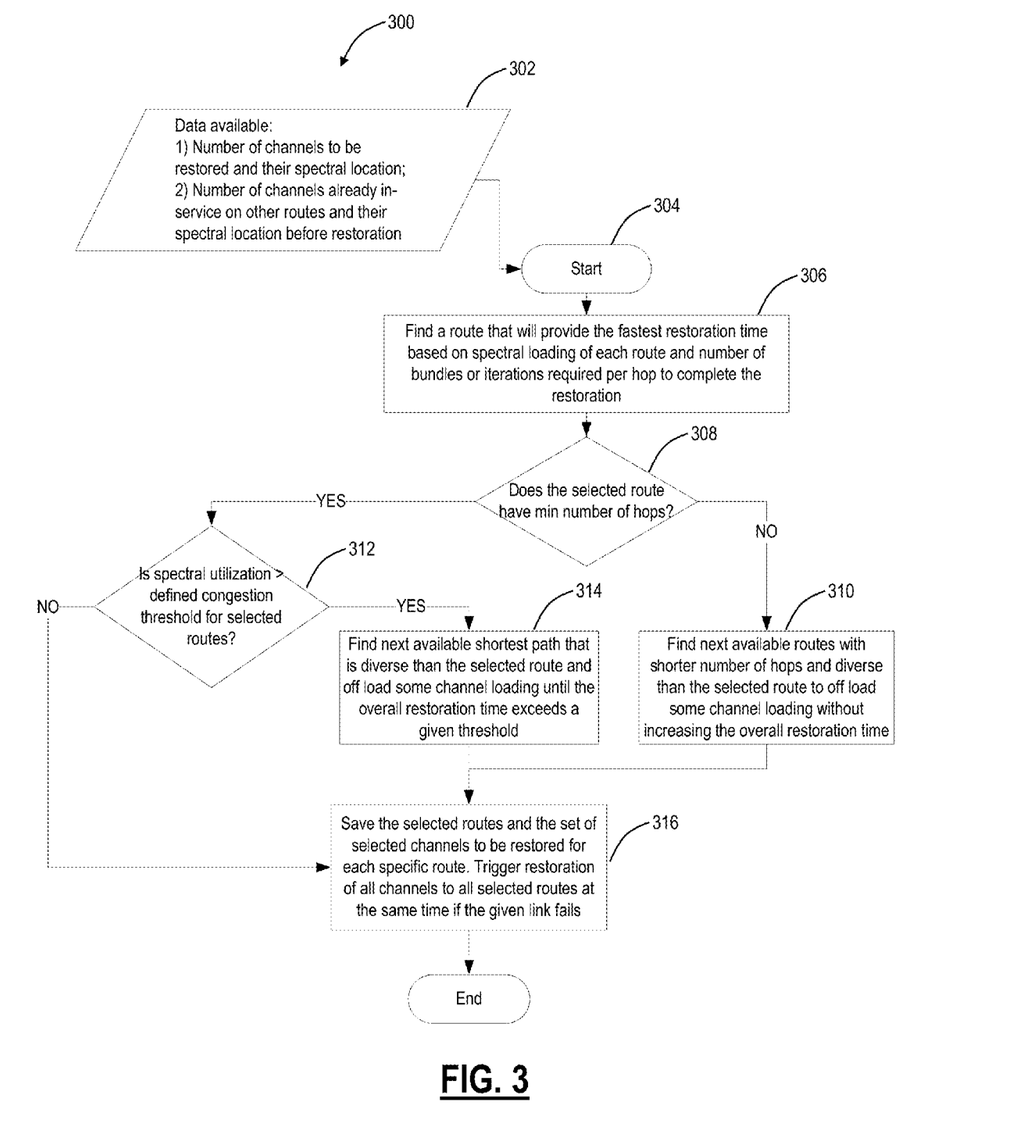
FIG. 3 is a flowchart of a process for selecting paths to improve optical service restoration time.

Referring to FIG. 3, in an exemplary embodiment, a flowchart illustrates a process 300 for selecting paths to improve optical service restoration time. The process 300 provides additional details from the process 200, and the process 300 can be implemented offline, as an optimization process. The process 300 is configured to distribute mesh-restorable channels (wavelengths) over single or multiple paths at the same time based on the spectral loading of each path in order to minimize the overall restoration time without incurring any unnecessary spectral congestion. Each path is selected such that they are optically independent of each other. Details of the process 300 are described in FIG. 3.

To start, the process 300 has input data before initiation: (1) the total number of wavelengths that need to be restored for a specific link between a source and destination pair in case of failure and their spectral location, (2) the available alternative routes between the source and destination pair that are optically independent of each other and the number of wavelengths present over different hops in each route and their spectral locations (step 302). The alternative routes can be selected based on least hops, least administrative weight, least latency, or a combination of multiple interesting matrices, metrics, or Figures of Merit.

The process 300 starts (step 304) and includes finding a route that will provide the fastest restoration time based on spectral loading of each route and number of bundles or iterations required per hop to complete the restoration (step 306). That is, once the alternative routes are known, in step 306, the process 300 estimates the restoration time to restore all channels to each route and searches for a route that provides the fastest restoration time. The route that can provide the fastest restoration time is noted, and it may not be the path with least hops or least latency, for example.

Again, the restoration time in an optical link between two optical add/drop multiplexer (OADM) hops depends on multiple factors that includes the channels to be restored, their total numbers and their spectral locations, the channels that are already present on that link and their spectral locations, and the number of optical amplifiers (for example, EDFAs) between the OADM hops. All these factors define how many bundles will be required to restore all channels to a link that also defines restoration time for that link. For a specific route that involves single or multiple optical links, the restoration time typically grows with the number of OADM hops almost linearly.

Once the route is selected that can provide the fastest restoration time, the process 300 can concentrate on reducing spectral congestion of each link for best effort without increasing the already estimated restoration time. It is possible to set a finite threshold with administrative weights both for the amount of allowable spectral congestion on a specific link, and the target restoration time below which the process 300 should make every attempt to keep the overall restoration time. In an exemplary embodiment, congestion avoidance can be considered another performance parameter, such as in addition to restoration time. The process 300 can include distributing a set of channels to diverse paths to minimize future congestion, based on the congestion avoidance, so long as this does not increase the restoration time too much.

At this stage, the process 300 checks if the selected route contains a minimum number of OADM hops (step 308). If not (step 308), the process 300 selects next available routes with shorter number of hops that are optically diverse than the selected route to offload some channel loading without increasing the overall restoration time (step 310). The ratio of channel off-loading depends on the spectral loading of each route that can be safely off-loaded without increasing the overall restoration time, or without driving that link beyond the specified congestion limit.

However, if the selected route already contains the least number of hops (step 308) and exceeds the given congestion limit (step 312), the process 300 finds the next available route that is diverse than the selected route and offload some channel loading until the overall restoration time exceeds a given threshold (step 314). Again, the ratio of channel off-loading depends on the spectral loading of that route that can be safely off-loaded without increasing the overall restoration time beyond the given threshold. All the selected route info and the set of selected channels to be restored for each specific route are then saved for a future link failure condition (step 316). If the link fail occurs, restoration can be triggered for all channels to their pre-computed routes at the same time to achieve the fastest restoration time.

In addition to that the process 300 can pre-estimate/control the restoration speed of a given set of services on a given path in a deterministic way by varying the photonic controller coefficients that control per channel actuators at each channel access sites to add/delete services in a faster or slower way.

Routing Examples

Figure 4:
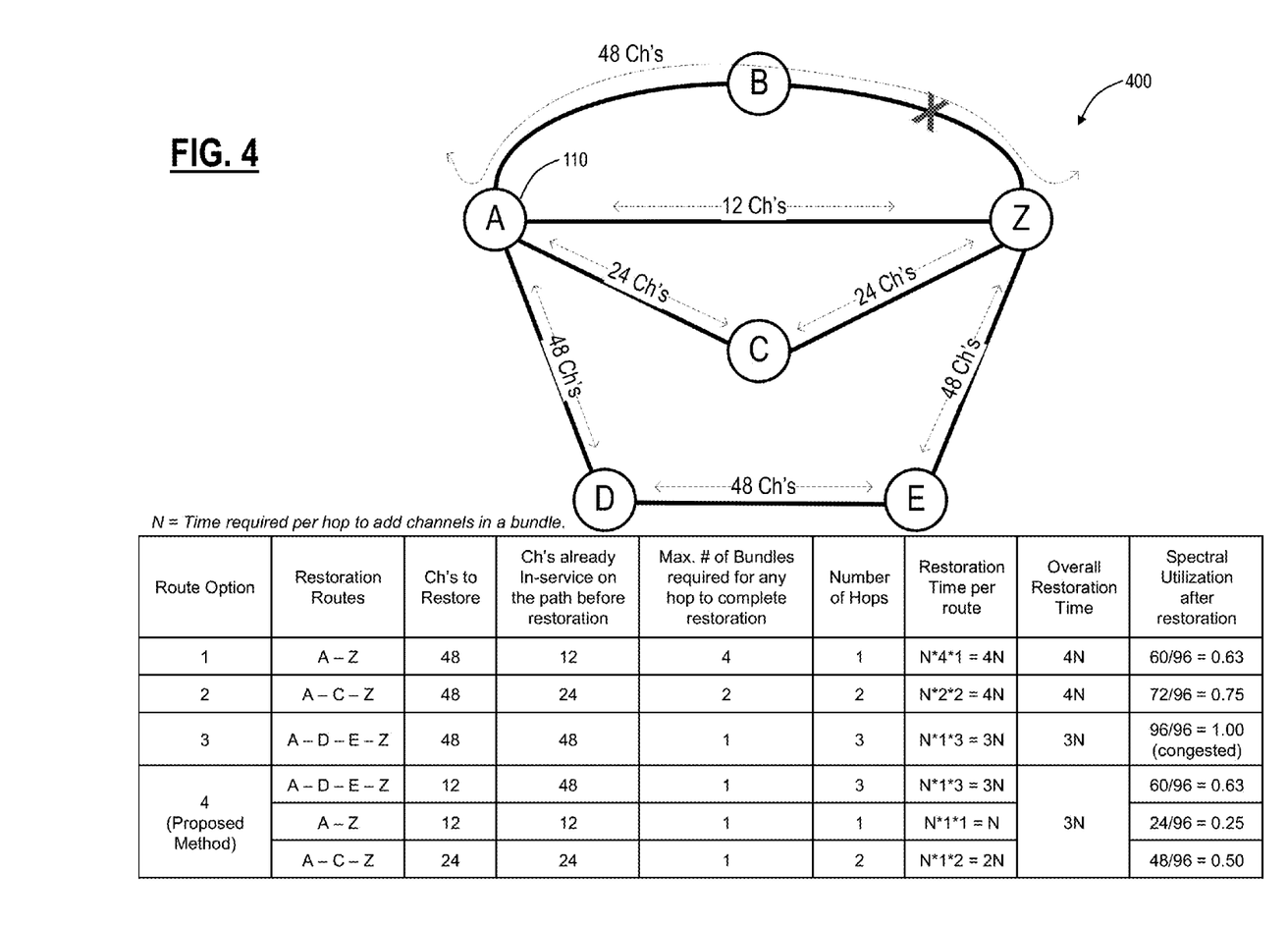
FIGS. 4 and 5 are network diagrams and tables of a network showing an example of the process of FIG. 3.
Figure 5:
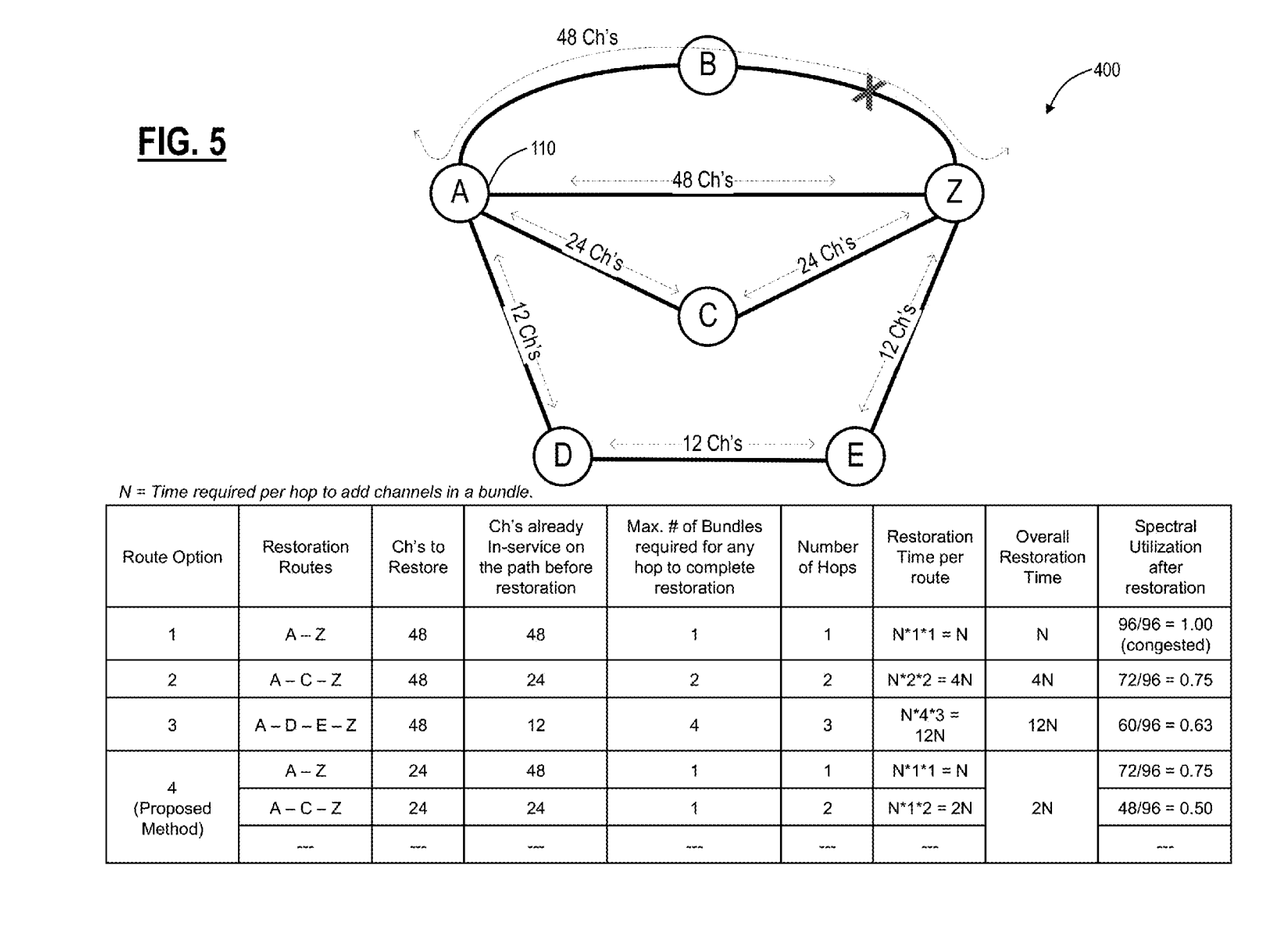

Referring to FIGS. 4 and 5, in an exemplary embodiment, network diagrams and tables illustrate a network 400 showing an example of the process 300. For simplicity and illustration purposes, in these examples, it is considered that if a link contains X number of channels, then in the first order, an additional X number of channels can be restored on that link in one bundle without causing any link budget impact on the in-service channels. In reality, the number of channels that can be included in a specific bundle may vary. In these examples, for simplicity, it is also considered that all optical links within a route are carrying the same set of channels between the source and destination pair. A 96 channel 50 Ghz C-band fixed grid spectrum, as defined by the Internal Telecommunication Union (ITU), is considered as well for these examples, where 48 channels on the route A-B-Z will need to be restored in a link failure condition. N is considered as the time required to restore a specific channel bundle on an optical links between two OADM hops, and spectral utilization is calculated for each link as the ratio of total number of channels after restoration to the total number of channels the link can accommodate in order to estimate how spectrally congested the link will be after restoration.

As illustrated in the table in FIG. 4, the proposed process 300 starts with route A-D-E-Z that will provide the fastest restoration time among all the other routes, and then incorporates other routes with shorter hops such as A-Z, and A-C-Z to re-distribute channel loads to keep a balanced spectral utilization condition. Since the channels will be restored to all selected routes at the same time, the overall restoration time, in this case, remains dominated by the number of hops in the first selected route A-D-E-Z, and does not increase by the channel re-distribution action.

However, channel loading condition can change over time, and the process 300 will need to re-calculate the routing and channel distribution table either periodically or each time a capacity change or restoration takes place in the network. The example in FIG. 5 demonstrates changed conditions of the same network with different channel loading conditions. In this case, the method starts with the route A-Z with the least hops that provides the fastest restoration time. However, if selected for all channels, the route will become congested (i.e. no more spectral slots will be left after restoration). In this condition, the process 300 will start checking on the target restoration time (e.g. 2N for this specific example) and searching for the next available route (in this case, A-C-Z) to off-load some channel loads in order to avoid spectral congestion.

In another exemplary embodiment, using a distributed control plane, a path set up message that would trigger a delayed wavelength addition to that link could be cranked back to the source node for reprocessing. Alternately, a link state topology update could be flooded throughout the network informing all nodes that this link is experiencing a service add delay, and such information could be used in path computation. When a source node receives the crank back or the topology update message, it could either compute alternate path or signal in the setup message that it wants to use the link in spite of the service addition delay.

Exemplary Network Element/Node

Figure 6:
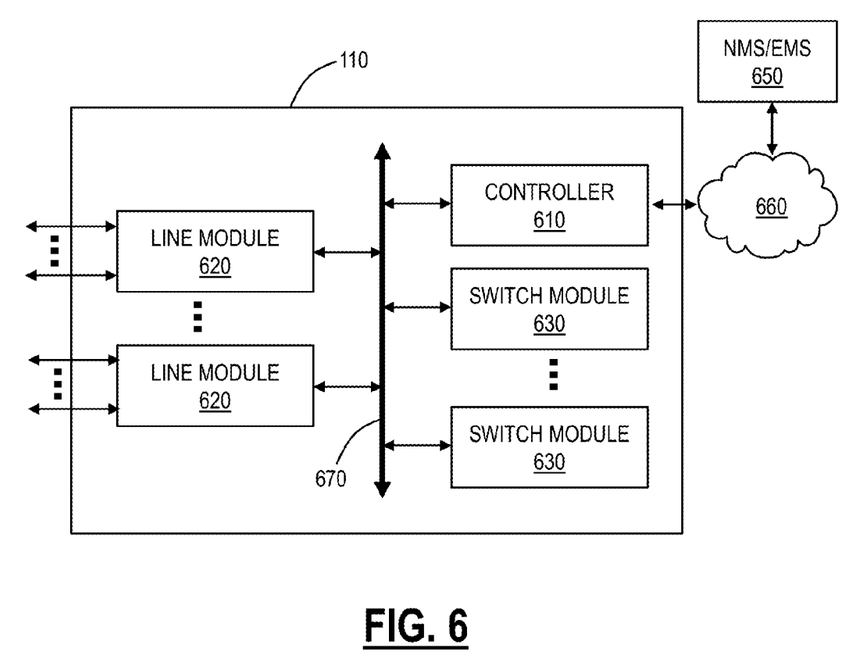
FIG. 6 is a block diagram of an exemplary node in the networks of FIGS. 1, 4, and 5.

Referring to FIG. 6, in an exemplary embodiment, a block diagram illustrates an exemplary node 110 in the network 100. In an exemplary embodiment, the exemplary node 110 can be a network element that may consolidate the functionality of a Packet-Optical Transport System (POTS), Multi-Service Provisioning Platform (MSPP), Digital Cross Connect (DCS), Ethernet and/or Optical Transport Network (OTN) switch, Wave Division Multiplexed (WDM) platform, etc. into a single, high-capacity intelligent switching system providing Layer 0, 1, and/or 2 consolidation. In another exemplary embodiment, the node 110 can be any of an OTN Add/Drop Multiplexer (ADM), ROADM, OADM, an MSPP, a DCS, a POTS, an optical cross-connect, an optical switch, a router, a switch, a WDM/DWDM platform, an access/aggregation device, etc. That is, the node 110 can be a photonic and/or digital system. The digital system can include ingress and egress digital signals and switching of channels, timeslots, tributary units, etc., and the photonic system can include ingress and egress wavelengths and switching. While the node 110 is generally shown as an optical network element, the systems and methods contemplated for use with any switching fabric, network element, or network requiring optical restoration.

In an exemplary embodiment, the node 110 includes a controller 610, one or more line modules 620, and one or more switch modules 630. The controller 610 can include Operations, Administration, Maintenance, And Provisioning (OAM&P) access; user interface ports; and the like. The controller 610 can connect to a management system 650 through a data communication network 660 (as well as a Path Computation Element (PCE), the SDN controller 150, OpenFlow controller, etc.). The management system 650 can include a network management system (NMS), element management system (EMS), or the like. Additionally, the controller 610 can be configured to operate the control plane as described herein. The node 110 can include an interface 670 for communicatively coupling the controller 610, the line modules 620, and the switch modules 630 together. For example, the interface 670 can be a backplane, midplane, a bus, optical or electrical connectors, or the like.

The line modules 620 are configured to provide ingress and egress to the switch modules 630 and to external connections forming digital connections on the links 120. From a logical perspective, the line modules 620 provide ingress and egress lines to the node 110, and each line module 620 can include one or more physical ports which form the lines. The line modules 620 can provide outputs at OTUk rates (k=2, 3, 4, Cn (n=1, 2, 3, . . . ) and different wavelengths. The switch modules 630 are configured to switch channels, wavelengths, timeslots, tributary units, packets, etc. between the line modules 620.

Those of ordinary skill in the art will recognize the node 110 can include other components which are omitted for illustration purposes, and that the systems and methods described herein is contemplated for use with a plurality of different network elements with the node 110 presented as an exemplary type of a network element. For example, in another exemplary embodiment, the node 110 may not include the switch modules 630, but rather have the corresponding functionality in the line modules 620 (or some equivalent) in a distributed fashion. Alternatively, for a DWDM, ROADM, OADM, etc., the node 110 may not include the switch modules 630 and corresponding functionality. For the node 110, other architectures providing ingress, egress, and switching between are also contemplated for the systems and methods described herein.

In an exemplary embodiment, the node 110 in a network 100, 400 is configured to improve optical restoration time for one or more wavelengths. Again, the node 110 includes one or more line modules 620 configured to interface the one or more wavelengths with the network 100, 400; and a controller 610 communicatively coupled to the one or more line modules 620. The controller 610 is configured to maintain a status of wavelength load for a plurality of optical links in the network, utilize the wavelength load to estimate a restoration time for the one or more wavelengths being added to each of the plurality of optical links, and determine one or more restoration paths for one or more wavelengths in the network and considering a total restoration time in selecting a path for each of the one or more wavelengths, wherein each of the one or more restoration paths includes one or more of the plurality of optical links. The total restoration time for a link is a function of i) channels being restored, ii) a total number of the channels and their spectral locations, iii) in-service channels that are already present on the link and their spectral locations, and vi) a number of optical amplifiers on the link. A path computation technique is used with associated metrics for determining the one or more restoration paths, wherein the total restoration time is used to select the path based on one of a lowest total restoration time, the total restoration time in combination with the metrics, and based on at least meeting a maximum total restoration time. The controller 610 maintains the status and performs the estimate over time, and wherein the apparatus determines the one or more restoration paths one of coincident with a failure and offline to anticipate the failure.

Exemplary Controller

Figure 7:
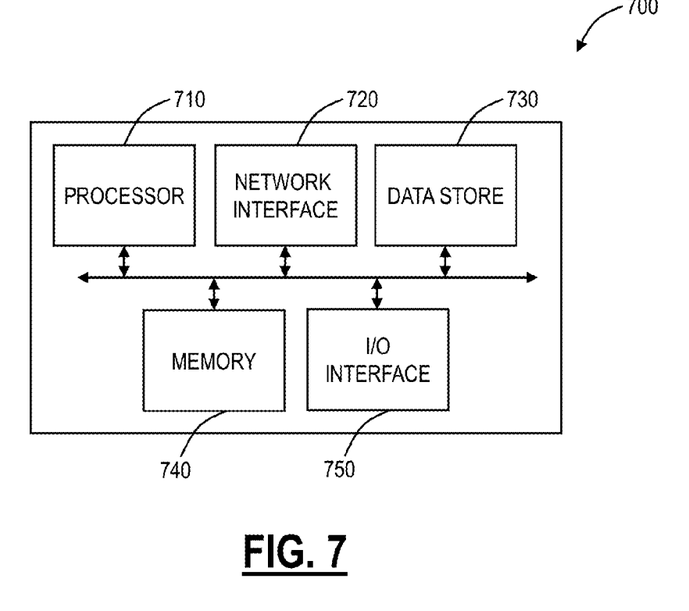

Referring to FIG. 7, in an exemplary embodiment, a block diagram illustrates a controller 700 which can be used for the SDN controller in FIG. 1, common equipment in the node of FIG. 6, a Path Computation Element (PCE), a planning tool, or the like. The controller 700 can include a processor 710 which is a hardware device for executing software instructions and the like. The processor 710 can be any custom made or commercially available processor, a central processing unit (CPU), an auxiliary processor among several processors associated with the controller 700, a semiconductor-based microprocessor (in the form of a microchip or chip set), or generally any device for executing software instructions. When the controller 700 is in operation, the processor 710 is configured to execute software stored within memory, to communicate data to and from the memory, and to generally control operations of the controller 700 pursuant to the software instructions. The controller 700 can also include a network interface 720, a data store 730, memory 740, Input/Output (I/O) interfaces 750, and the like, all of which are communicatively coupled together.

The network interface 720 can be used to enable the controller 700 to communicate on the DCN 660 or the like, such as to communicate control plane information to other controllers, to the management system 250, to communicate SDN commands, and the like. The data store 730 can be used to store data, such as wavelength load, network topology, control plane information, provisioning data, OAM&P data, etc. The data store 730 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 730 can incorporate electronic, magnetic, optical, and/or other types of storage media. The memory 740 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 740 may incorporate electronic, magnetic, optical, and/or other types of storage media. Note that the memory 740 can have a distributed architecture, where various components are situated remotely from one another, but may be accessed by the processor 710. The I/O interface 750 includes components for the controller communicate to communicate with other devices. Further, the I/O interface 750 includes components for the controller 700 to communicate with the other nodes 110, such as using General Communication Channel (GCC) overhead or the like.

In an exemplary embodiment, the controller 700 is configured to improve optical restoration time in a network. Again, the controller 700 includes the network interface 720 communicatively coupled to the network; the processor 710 communicatively coupled to the network interface 720; and the memory 740 storing instructions that, when executed, cause the processor 710 to maintain a status of wavelength load for a plurality of optical links in the network, utilize the wavelength load to estimate a restoration time for one or more wavelengths being added to each of the plurality of optical links, and determine one or more restoration paths for one or more wavelengths in the network and considering a total restoration time in selecting a path for each of the one or more wavelengths, wherein each of the one or more restoration paths includes one or more of the plurality of optical links. The controller 700 can maintain the status based on updates from one or more of a control plane and Software Defined Networking (SDN). The estimate is a unit of time to add a bundle of wavelengths to a particular optical link, and the estimate is derived computationally. The total restoration time for a link is a function of i) channels being restored, ii) a total number of the channels and their spectral locations, iii) in-service channels that are already present on the link and their spectral locations, and vi) a number of optical amplifiers on the link.

A path computation technique is used with associated metrics to determine the one or more restoration paths, wherein the total restoration time is used to select the path based on one of a lowest total restoration time, the total restoration time in combination with the metrics, and based on at least meeting a maximum total restoration time. The controller 700 maintains the status and performs the estimate over time, and wherein the apparatus determines the one or more restoration paths one of coincident with a failure and offline to anticipate the failure. The memory 710 storing instructions that, when executed, further cause the processor to, subsequent to the estimate, mark one or more links as unacceptable based on delay in the restoration time. The controller 700 can be one or more of a controller executing a control plane, a Software Defined Networking (SDN) controller, a Path Computation Element (PCE), a management system, and a planning tool.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for improving optical restoration time in a network, the method comprising:
   maintaining a status of wavelength load for a plurality of optical links in the network;
   utilizing the wavelength load to estimate a restoration time for one or more wavelengths being added to each of the plurality of optical links, wherein the estimate is a time to add the one or more wavelengths based on the wavelength load currently on each of the plurality of links, and the time is based on an associated photonic control process to add the one or more wavelengths; and determining one or more restoration paths for the one or more wavelengths in the network and considering a total restoration time in selecting a path for each of the one or more wavelengths, wherein each of the one or more restoration paths comprises one or more of the plurality of optical links.

2. The method of claim 1, wherein the maintaining is performed based on updates from one or more of a control plane and Software Defined Networking (SDN), and wherein the utilizing, and the determining is performed by one or more of a control plane, a Software Defined Networking (SDN) controller, a Path Computation Element (PCE), a management system, and a planning tool.

3. The method of claim 1, wherein the estimated restoration time is a unit of time to restore a bundle of wavelengths to a particular optical link, and the estimated restoration time is derived computationally.

4. The method of claim 1, wherein the total restoration time for a link is a function of one or more of i) channels being restored, ii) a total number of the channels and iii) their spectral locations, iv) in-service channels that are already present on the link and v) their spectral locations, and vi) a number of optical amplifiers on the link.

5. The method of claim 1, wherein the determining utilizes a path computation technique with associated metrics for determining the one or more restoration paths, wherein the total restoration time is used to select the path based on one of a lowest total restoration time, the total restoration time in combination with the metrics, and based on at least meeting a maximum total restoration time.

6. The method of claim 1, wherein the maintaining and the utilizing are performed over time, and the determining is performed one of subsequent to a failure and offline to anticipate the failure.

7. The method of claim 1, further comprising:
subsequent to the estimate, marking one or more links as unacceptable based on the restoration time.

8. The method of claim 1, wherein the determining one or more restoration paths for one or more wavelengths in the network further comprises considering congestion avoidance as long as the total restoration time is not increased.

9. An apparatus configured to improve optical restoration time in a network, the apparatus comprising:
a network interface communicatively coupled to the network;
a processor communicatively coupled to the network interface; and
memory storing instructions that, when executed, cause the processor to
maintain a status of wavelength load for a plurality of optical links in the network,
utilize the wavelength load to estimate a restoration time for one or more wavelengths being added to each of the plurality of optical links, wherein the estimate is a time to add the one or more wavelengths based on the wavelength load currently on each of the plurality of links, and the time is based on an associated photonic control process to add the one or more wavelengths, and
determine one or more restoration paths for the one or more wavelengths in the network and considering a total restoration time in selecting a path for each of the one or more wavelengths, wherein each of the one or more restoration paths comprises one or more of the plurality of optical links.

10. The apparatus of claim 9, wherein the apparatus maintains the status based on updates from one or more of a control plane and Software Defined Networking (SDN), and wherein the apparatus is one or more of a controller executing a control plane, a Software Defined Networking (SDN) controller, a Path Computation Element (PCE), a management system, and a planning tool.

11. The apparatus of claim 9, wherein the estimated restoration time is a unit of time to restore a bundle of wavelengths to a particular optical link, and the estimated restoration time is derived computationally.

12. The apparatus of claim 9, wherein the total restoration time for a link is a function of one or more of i) channels being restored, ii) a total number of the channels and iii) their spectral locations, iv) in-service channels that are already present on the link and v) their spectral locations, and vi) a number of optical amplifiers on the link.

13. The apparatus of claim 9, wherein a path computation technique is used with associated metrics to determine the one or more restoration paths, wherein the total restoration time is used to select the path based on one of a lowest total restoration time, the total restoration time in combination with the metrics, and based on at least meeting a maximum total restoration time.

14. The apparatus of claim 9, wherein the apparatus maintains the status and performs the estimate over time and wherein the apparatus determines the one or more restoration paths one of subsequent to a failure and offline to anticipate the failure.

15. The apparatus of claim 9, wherein the memory storing instructions that, when executed, further cause the processor to
subsequent to the estimate, mark one or more links as unacceptable based on the restoration time.

16. The apparatus of claim 9, wherein the one or more restoration paths for one or more wavelengths in the network are determined further considering congestion avoidance as long as the total restoration time is not increased.

17. A node in a network configured to improve optical restoration time for one or more wavelengths, the node comprising:
one or more line modules configured to interface the one or more wavelengths with the network; and
a controller communicatively coupled to the one or more line modules, wherein the controller is configured to
maintain a status of wavelength load for a plurality of optical links in the network,
utilize the wavelength load to estimate a restoration time for the one or more wavelengths being added to each of the plurality of optical links, wherein the estimate is a time to add the one or more wavelengths based on the wavelength load currently on each of the plurality of links, and the time is based on an associated photonic control process to add the one or more wavelengths, and
determine one or more restoration paths for the one or more wavelengths in the network and considering a total restoration time in selecting a path for each of the one or more wavelengths, wherein each of the one or more restoration paths comprises one or more of the plurality of optical links.

18. The node of claim 17, wherein the total restoration time for a link is a function of one or more of i) channels being restored, ii) a total number of the channels and iii)

their spectral locations, iv) in-service channels that are already present on the link and v) their spectral locations, and vi) a number of optical amplifiers on the link.

19. The node of claim 17, wherein a path computation technique is used with associated metrics for determining the one or more restoration paths, wherein the total restoration time is used to select the path based on one of a lowest total restoration time, the total restoration time in combination with the metrics, and based on at least meeting a maximum total restoration time.

20. The node of claim 17, wherein the controller maintains the status and performs the estimate over time and wherein the apparatus determines the one or more restoration paths one of subsequent to a failure and offline to anticipate the failure.

* * * * *